Patented Dec. 5, 1933

1,938,012

UNITED STATES PATENT OFFICE 1,938,012

AZODYESTUFFS

Ernst Fellmer, Leverkusen-on-the-Rhine, Germany, assignor to General Aniline Works, Inc., New York, N. Y., a corporation of Delaware No Drawing. Application September 4, 1930, Serial No. 479,793, and in Germany September 7, 1929

7 Claims. (Cl. 260—71)

The present invention relates to azodyestuffs and to the products dyed therewith.

The process of manufacture in accordance with the invention is by tetrazotizing a benzidine sulfonic- or -carboxylic acid or a derivative thereof, coupling with two molecules of a middle component capable of further diazotization, again diazotizing and coupling with one molecule of a naphthalene-sulfonic acid of the probable formula:

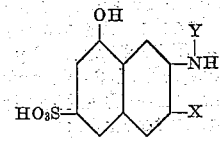

wherein X stands for hydrogen or the sulfonic acid group, Y stands for hydrogen or for alkyl which may be substituted by a hydroxy- or an amino-group, or for benzyl which may be substituted by a sulfo-, carboxylic acid-, hydroxy- or an amino-group, and with one molecule of a naphthalene sulfonic acid of the probable formula:

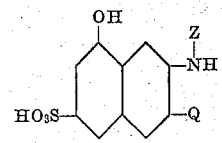

wherein Q stands for hydrogen or the sulfonic acid group, Z stands for hydrogen, or for alkyl, which may be substituted by hydroxy- or amino-groups, but only one of the symbols Y and Z being hydrogen.

The dyestuffs form in the dry state dark grey to black powders, soluble in strong sulfuric acid with dark blue to bluish black colorations. They form dark colored alkali metal salts, which are soluble in water, dyeing silk generally bluish black to black shades of good fastness to water. They probably correspond to the general formula:

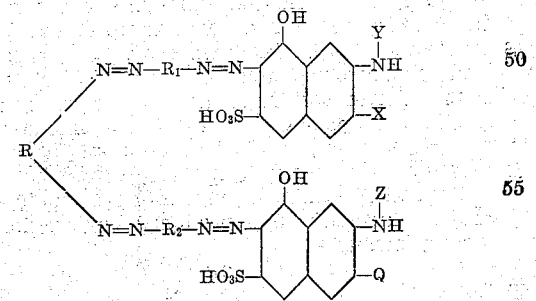

wherein R represents a benzidine residue being substituted by sulfonic acid- or carboxylic acid-groups, $R_1$ and $R_2$ stand for aromatic radicals of the benzene series, X stands for hydrogen or a sulfonic acid group, Y stands for hydrogen or alkyl which may be substituted by a hydroxy- or an amino-group, or for benzyl which may be substituted by a sulfo-, carboxylic acid-, hydroxy- or an amino group, Z stands for hydrogen or alkyl which may be substituted by a hydrxy- or an amino-group, but only one of the symbols Y and Z being hydrogen, and Q stands for hydrogen or for the sulfonic acid group.

The invention is illustrated by the following examples, without being limited thereto:

Example 1.—34,4 parts by weight of benzidine-o-disulfonic acid are tetrazotized at 10° C. with 13,8 parts by weight of sodium nitrite and hydrochloric acid, and to this mixture there is added a solution of 27,4 parts by weight of cresidine and hydrochloric acid, the acid reaction of the final mixture to congo paper being removed by the addition of sodium acetate. When the coupling is complete the isolated diaminodisazo compound is tetrazotized with 13,8 parts by weight of sodium nitrite and hydrochloric acid and stirred for several hours at ordinary temperature. The soda alkaline solution of 31,9 parts by weight of 2.8-aminonaphthol-3.6-disulfonic acid and 29,5 parts by weight of butyl-2-amino-8-naphthol-6-sulfonic acid is added to the solution and the dyestuff produced having the following formula:

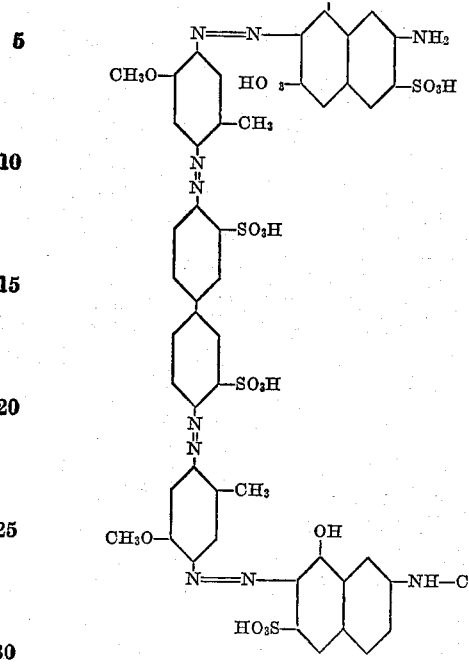

is isolated in the customary manner and dyes silk deep black shades.

*Example 2.*—The diaminodisazo compound obtainable in accordance with Example 1 is tetrazotized with 13,8 parts by weight of sodium nitrite and hydrochloric acid and stirred for several hours at ordinary temperature. The tetrazo compound is coupled with the soda alkaline solution of 31,9 parts by weight of 2.8-aminonaphthol-3.6-disulfonic acid and 28,3 parts by weight of 2-hydroxyethyl-amino-8-naphthol-6-sulfonic acid and the dyestuff thus produced having the following formula:

is isolated in the customary manner and dyes silk in deep black shades.

*Example 3.*—The diaminodisazo compound obtainable in accordance with Example 1 is tetrazotized with 13,8 parts by weight of sodium nitrite and hydrochloric acid and coupled with the soda alkaline solution of 72,4 parts by weight of 2-aminoethylamino-8-naphthol-3.6-disulfonic acid. The dyestuff thus produced having the following formula:

is isolated in the customary manner and dyes silk in deep greenish black shades.

*Example 4.*—The diaminodisazo compound obtainable in accordance with Example 1 is tetrazotized with 13.8 parts by weight of sodium nitrite and hydrochloric acid and coupled with 31.9 parts by weight of 2.8-aminonaphthol-3.6-disulfonic acid and 32.9 parts by weight of 2-benzyl-amino-8-naphthol-6-sulfonic acid in soda alkaline solution. The dyestuff thus produced having the following formula:

is isolated in the customary manner and dyes silk black shades.

I claim:

1. Azodyestuffs of the general formula:

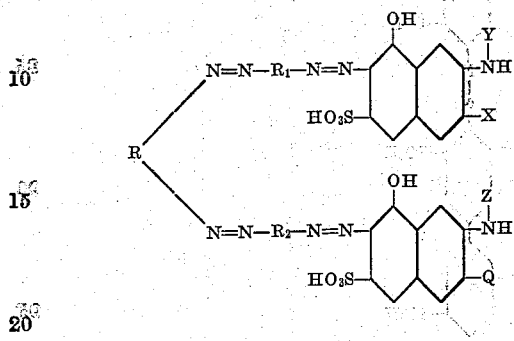

wherein R represents a benzidine residue being substituted by sulfonic acid- or carboxylic acid groups, $R_1$ and $R_2$ stand for aromatic radicals of the benzene series, X stands for hydrogen or a sulfonic acid group, Y stands for hydrogen or alkyl which may be substituted by a hydroxy- or an amino-group, or for benzyl which may be substituted by a sulfonic acid-, carboxylic acid-, hydroxy- or an amino-group, Z stands for hydrogen or alkyl which may be substituted by a hydroxy- or an amino-group but only one of the symbols Y and Z being hydrogen, and Q stands for hydrogen or for a sulfonic acid group, being in the dry state dark grey to black powders, soluble in strong sulfuric acid with dark blue to bluish black colorations.

2. Azodyestuffs of the general formula:

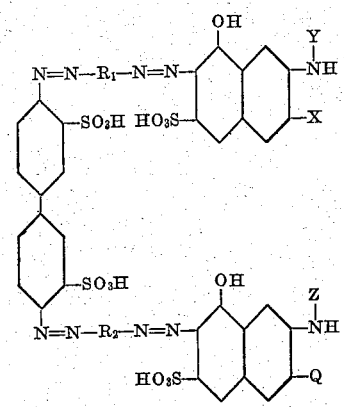

wherein $R_1$ and $R_2$ stand for aromatic radicals of the benzene series, X stand for hydrogen or a sulfonic acid group, Y stands for hydrogen or alkyl which may be substituted by a hydroxy- or an amino-group, or for benzyl which may be substituted by a sulfonic acid-, carboxylic acid-, hydroxy- or an amino-group, Z stands for hydrogen or alkyl which may be substituted by a hydroxy- or an amino-group but only one of the symbols Y and Z being hydrogen, and Q stands for hydrogen or for a sulfonic acid group, being in the dry state dark grey to black powders, soluble in strong sulfuric acid with dark blue to bluish black colorations.

3. Azodyestuffs of the general formula:

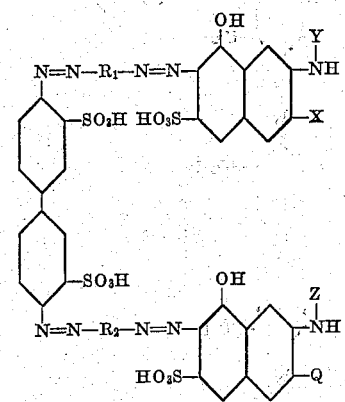

wherein $R_1$ and $R_2$ stand for benzene nuclei, X stands for hydrogen or a sulfonic acid group, Y stands for hydrogen, or alkyl which may be substituted by a hydroxy- or an amino-group, or for benzyl which may be substituted by a sulfonic acid-, carboxylic acid-, hydroxy- or an amino-group, Z stands for hydrogen or alkyl which may be substituted by a hydroxy- or an amino-group, but only one of the symbols Y and Z being hydrogen, and Q stands for hydrogen or for a sulfonic acid group, being in the dry state dark grey to black powders, soluble in strong sulfuric acid with dark blue to bluish black colorations.

4. Azodyestuffs of the general formula:

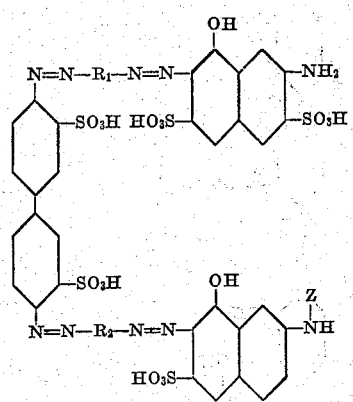

wherein $R_1$ and $R_2$ stand for benzene nuclei and Z stands for alkyl which may be substituted by a hydroxy- or an amino-group, being in the dry state dark grey to black powders, soluble in strong sulfuric acid with dark blue to bluish black colorations.

5. The azodyestuff of the formula:
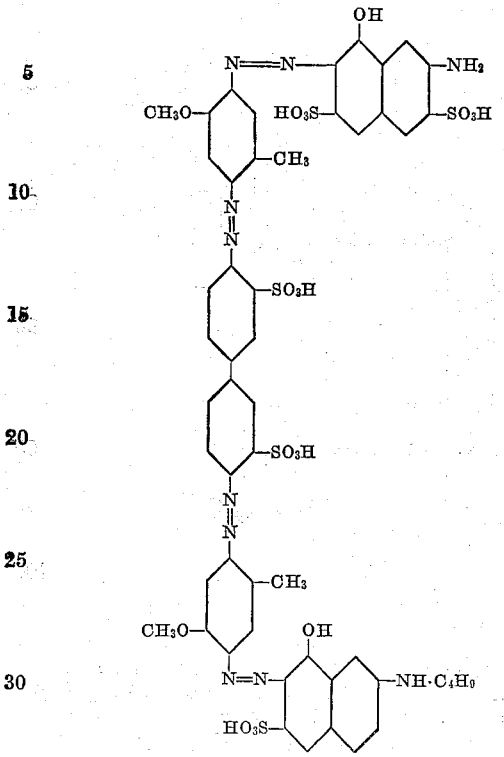
being a dark powder and dyeing silk deep black shades.
6. The azodyestuff of the formula:
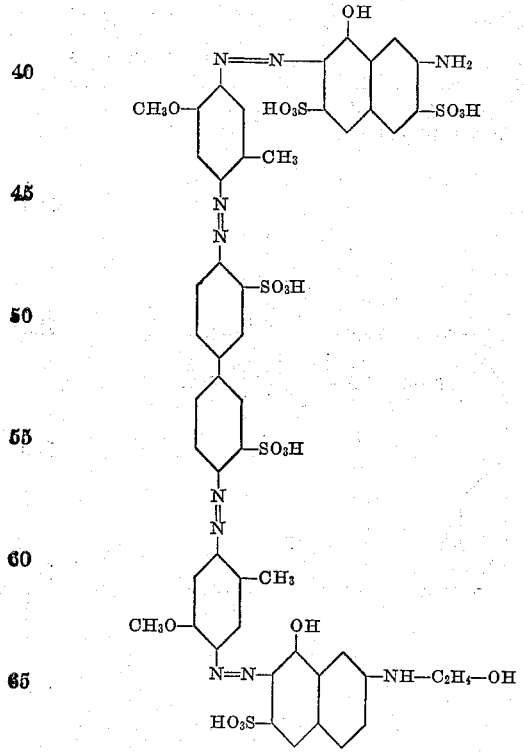
which dyes silk deep black shades.
7. The azodyestuff of the formula:
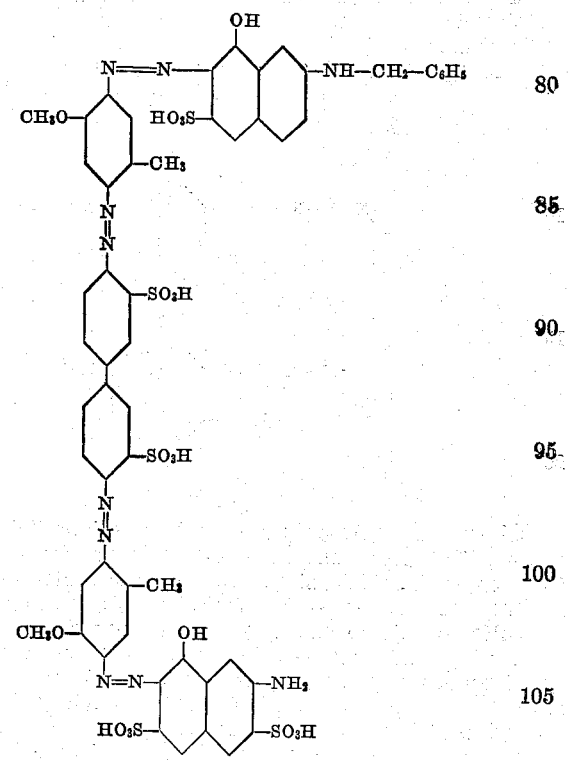
which dyes silk black shades.
ERNST FELLMER.